(12) United States Patent
Maharyta et al.

(10) Patent No.: US 8,576,189 B1
(45) Date of Patent: Nov. 5, 2013

(54) AC LINE SYNCHRONIZATION FOR CAPACITIVE SENSING

(75) Inventors: Andriy Maharyta, Lviv (UA); Andriy Ryshtun, Lviv (UA); Victor Kremin, Lviv (UA)

(73) Assignee: Cypress Semiconductor Corp., San Jose, CA (US)

( * ) Notice: Subject to any disclaimer, the term of this patent is extended or adjusted under 35 U.S.C. 154(b) by 553 days.

(21) Appl. No.: 12/983,245

(22) Filed: Dec. 31, 2010

Related U.S. Application Data

(60) Provisional application No. 61/376,412, filed on Aug. 24, 2010.

(51) Int. Cl.
*G06F 3/041* (2006.01)
*G06F 3/038* (2013.01)
*G06F 3/044* (2006.01)

(52) U.S. Cl.
USPC .......................................... 345/173; 345/174

(58) Field of Classification Search
None
See application file for complete search history.

(56) References Cited

U.S. PATENT DOCUMENTS

| | | | |
|---|---|---|---|
| 2007/0165444 A1* | 7/2007 | Culver et al. ................. | 365/151 |
| 2011/0043227 A1* | 2/2011 | Pance et al. .................... | 324/681 |
| 2012/0019474 A1* | 1/2012 | Hsieh et al. .................... | 345/174 |
| 2012/0034888 A1* | 2/2012 | De Flaviis ...................... | 455/129 |
| 2012/0049868 A1* | 3/2012 | Maharyta ....................... | 324/679 |
| 2012/0262406 A1* | 10/2012 | Hotelling et al. ............. | 345/173 |
| 2012/0327013 A1* | 12/2012 | Lee et al. ....................... | 345/174 |
| 2013/0176281 A1* | 7/2013 | HOTELLING et al. ....... | 345/174 |

* cited by examiner

Primary Examiner — Andre Allen

(57) ABSTRACT

A method includes powering multiple touch sensors using DC power derived from an AC power signal; monitoring the AC power signal and producing from the AC power signal a trigger signal that occurs repeatedly at a predetermined point in a cycle of the AC power signal; and initiating a scan of the touch sensors when the trigger signal occurs during each cycle of the AC power signal.

20 Claims, 5 Drawing Sheets

AC LINE SYNCHRONIZATION FOR CAPACITIVE SENSING

PRIORITY CLAIM

This application claims priority under 35 U.S.C. 119 to USA provisional application No. 61/376,412 filed on Aug. 24, 2010, the entirety of which is incorporated by reference herein.

BACKGROUND

Capacitive sensors may detect the touch (or proximity of touch) of a human being or other conductive object, and output an indication of this touch or proximity. This type of sensor will be referred to herein as a 'touch sensor', although technically the sensor is measured for changes in capacitance $C_F$ due to the proximity of a person's body part (e.g., their finger), not necessarily actual galvanic contact with the person or body part. Many types of modern devices comprise touch sensors, including computers, phones, and appliances.

DETAILED DESCRIPTION

Preliminaries

Figure 1:
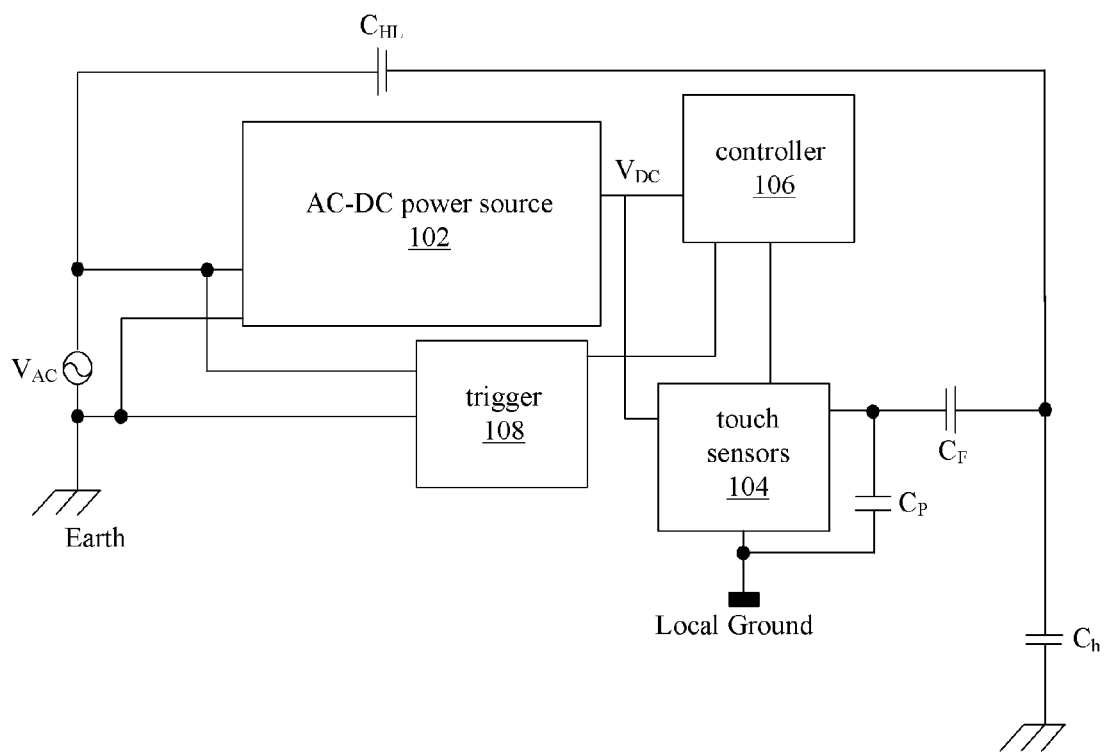
FIG. 1 illustrates an embodiment of an AC powered device using DC powered touch sensors.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural (more than one) number also include the plural or singular number respectively. Additionally, the words "herein," "above," "below" and words of similar import, when used in this application, refer to this application as a whole and not to any particular portions of this application.

"Logic" refers to machine memory circuits, machine readable media, and/or digital or analog circuitry which by way of its material and/or material-energy configuration comprises control and/or procedural signals, and/or settings and values, that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations of memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in or across one or more computing devices. The particular distribution and choice of logic is a design decision that will vary according to implementation.

Overview

A touch sensing system may be designed to include touch sensors operated using direct current (DC) power, whose original power source is from the household or other AC supply. A digital controller repeatedly scans the outputs of the one or more touch sensors. Trigger logic monitors an alternating current (AC) signal from which the DC power is derived and produces a trigger signal to the digital controller. The touch sensors may operate in reference to a local (device relative) ground, while the AC signal varies relative to an earth ground. The digital controller is adapted to wait for the trigger signal to have a predetermined value (hi, low, rising edge, falling edge, etc.) before beginning a measurement of the one or more touch sensors. The trigger signal may be an analog or digital signal, which may be further converted to a digital value (e.g., one or more 'bits') and the digital value made available to the digital controller.

The measurement of each touch sensor occurs at approximately the same point within the AC cycle, with the coupled noise from the user in the same phase in each measurement. Thus the amount of AC signal coupled through the user into each measurement is approximately constant. In this manner, a reduction in the AC signal noise introduced into the operation of touch sensors may be achieved.

DESCRIPTION OF PARTICULAR EMBODIMENTS

FIG. 1 illustrates an embodiment of a DC powered touch sensor device with a trigger coupled to an AC power signal. The device draws power from an alternating current (AC) input signal $V_{AC}$ and converts this power to direct current ($V_{Dc}$) to power components of the device. $V_{AC}$ is referenced to earth ground and $V_{AC}$ is referenced to a local device ground. An AC to DC power source 102 receives $V_{AC}$ and outputs $V_{DC}$ to components of the device. Device components may include a digital controller 106 and one or more touch sensors 104. The capacitance touch sensors 104 may detect the presence of a human being.

Other capacitive effects in the device include $C_H$, the capacitance to earth ground introduced by the human body; $C_P$, the parasitic capacitances in the sensors; and $C_{HL}$, the capacitance between the human body and the AC power signal.

Capacitance $C_{HL}$ couples the AC signal, as present in the proximate AC mains, into the person interacting with the capacitance touch sensors 104. When the person touches or becomes proximate to one or more of the capacitance touch sensors, they couple a portion of the AC mains as noise into the sensor being measured. In other words, a person, interacting with the touch sensors, is in some level of proximity to the same AC supply used to power (following AC-DC conversion) the touch sensing system. This proximity allows a portion of the electromagnetic fields from the AC supply to couple into the user. When that user interacts with the touch sensing system, they couple that portion of the AC supply into the touch sensor as low-frequency (nominally 50 or 60 Hz) high-amplitude (e.g., greater than 100V peak-to-peak) noise.

In a typical application the DC powered components of the device are not referenced to earth ground, and the touch sensors employ a half-wave demodulation technique (explained below). FIG. 1 illustrates that a ground path ($C_F \rightarrow C_H \rightarrow$ earth ground) from the device may be formed through the body of a person who touches the device.

Sensing systems utilizing half-wave demodulation convert capacitance into an intermediate value (e.g., voltage, time intervals, duty cycle, current) typically by sensing one of capacitor charging or discharging current. One example of a half-wave demodulation technique introduces a current into a capacitance sensor, and measures the time (often with a counter) until the voltage on that sensor has reached a specific value (using a comparator). Once it reaches the target level, counting is stopped and the sensor is discharged back to ground. In this case, the charging time, but not the discharging time, is measured. Capacitance sensing systems utilizing full-wave demodulation convert both capacitor charging and discharging currents into values, and average these values in some way.

Whether half-wave or full-wave demodulation is utilized, high-amplitude, low frequency noise (e.g., from AC power sources) injects noise current into the sensing scheme. In capacitive sensing systems utilizing full-wave demodulation, the injected noise current from capacitor charge and discharge is subtracted, thus reducing the overall measured noise. This is not the case for sensing schemes utilizing half-wave demodulation.

In some applications, the power source 102 may comprise an isolated supply, employing a capacitor between the internal AC transformer windings. This capacitor (not shown), along with inter-winding capacitances, may also affect the noise introduced into the sensor measurements.

Although described in terms of non-earth-grounded devices employing half wave demodulation (and possibly also isolated AC-DC power sources), the logic and procedures disclosed herein may in some implementations be applied to earth grounded devices, devices employing non-isolated power supplies, or devices employing full-wave demodulation techniques with touch sensors.

The exemplary device includes multiple touch sensors 104, although a single sensor may be employed in some applications. A digital controller 106 is configured to receive outputs from the touch sensors and to initiate measurement and scanning of these outputs upon detection of a signal from trigger logic 108. The trigger logic 108 is coupled to an AC power signal that is converted to DC to power the touch sensors 104. A trigger signal to the digital controller 106 is generated at a substantially same point in each cycle of the AC power signal. "Substantially same point" in the AC cycle means a same voltage or current level value, within tolerances of the circuit components that are employed.

The digital controller 106 may interface to the touch sensors 104 via I/O control logic. The I/O control logic (not illustrated) may be a component of the digital controller 106 or an external component. The digital controller 106 may respond to logic embodied in an internal memory component, an external memory component, or both (not illustrated).

Figure 2:
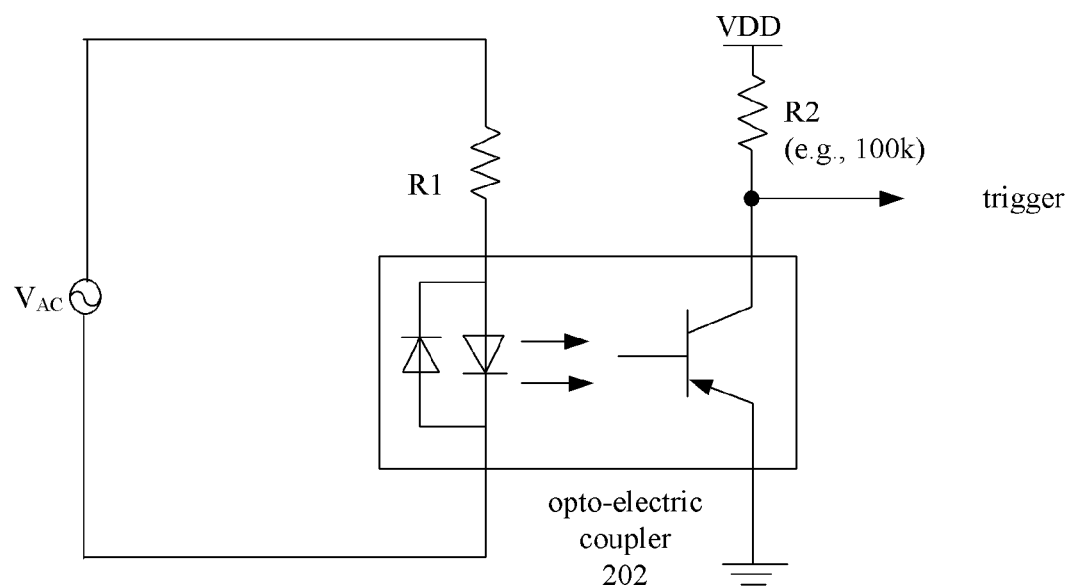
FIG. 2 illustrates an embodiment of circuitry to couple a sense operation trigger with an AC power signal phase.

FIG. 2 illustrates an embodiment of galvanically isolated trigger logic. Non-isolated circuits may also be used for some applications, such as dimmers with touch control. The trigger logic may include an opto-electric coupler 202. The illustrated opto-electric coupler 202 may include light emitting diode (LED) elements. The diodes may be anti-parallel, that is, they may face opposite directions in different parallel arms of the circuit. The anti-parallel diodes may be configured in series with a current-limiting impedance element R to which is applied the AC signal that powers the device.

The exemplary trigger logic shown in FIG. 2 produces two output pulses per AC cycle. If only a single trigger signal to the digital controller is desired per AC cycle, a diode may be added in series with R1 to block one of the AC phases. Or, the opto coupler may be adapted to have only a single LED. A divide-by-2 flip flop may be employed in the output path so that only a single trigger is generated from a pair of output pulses. Firmware solutions are also possible including logic to ensure that the sense or measurement process exceeds half of the period before the next reaction to a trigger occurs, or identifying every other output pulse in code executed by the digital controller. These of course are only some of the possible ways to obtain a single trigger from multiple output cycles or pulses from the trigger logic.

The forward biased light emitting diode of the opto-electric coupler is configured to increase optical output as the AC signal cycles from zero (0) to a peak signal level. Optical output then decreases again to zero (0). Optical output of the reverse-connected light emitting diode increases as the AC signal rises to a peak negative level. The result is an optical signal with an intensity that tracks a level of the AC power signal. The optical signal is coupled (e.g., to the base of a biased phototransistor) to produce an output signal in the electrical domain.

An output signal produced by logic in FIG. 2 ramps down and up along with the optical output of the light emitting diodes. Depending on the bias level of the phototransistor, set by the supply voltage VDD and the current limiting resistor R2, at some point the output signal may plateau near ground when the transistor saturates, and may plateau near VDD when $V_{AC}$ is near 0V and the phototransistor is in cutoff. The output signal is applied to a digital input of the digital controller 106. In an alternate embodiment, the output signal may be applied to an analog input of the digital controller 106. When the output signal exceeds a certain level, it may be identified as a positive trigger signal, e.g., as a digital "1" or "high", to the digital controller 106. Below this level the output signal may be identified to the controller as a negative trigger signal, e.g., as a digital "0" or "low". To reduce jitter in the presence of a slow changing output signal, the signal provided to the digital controller 106 may employ hysteresis in the form of a Schmitt trigger or other positive feedback control.

In some applications optical isolation of the AC signal from the output signal may not be required, and the AC signal may be coupled (monitored to produce the output signal) electrically. Such coupling may be in the form of resistor coupling, capacitive coupling, or inductive coupling. In resistor coupling the high voltage of the source AC power may be reduced using a resistive divider to provide signal levels compatible with the digital controller 106. Likewise for any form of electrical coupling, the signal may need to be clamped to prevent an over-voltage condition at the input to the digital controller 106, and similarly protected from transitions below the signal ground of the digital controller 106.

A trigger signal is generated at a same point or points during each AC signal cycle. When operated with a full-wave opto-coupler such as the embodiment shown in FIG. 2, two trigger signals are generated for each complete cycle (i.e., each period) of the AC supply signal. In a half-wave opto-coupler having only a single light emitting diode on the primary side connected to the AC supply, only one trigger signal is generated for each period of the AC supply signal. Likewise it is possible to convert a full-wave opto-coupler such as the one illustrated in FIG. 2 into a half-wave through the addition of a diode, e.g., 1N4007, in series with current limiting resistor R1. The selection of full-wave vs. half-wave trigger generation may be determined in part by the time required to measure all the attached touch sensors 104. In an alternate embodiment, multiple trigger signals may be processed using logic (e.g., hardware or firmware) to discard or skip alternate trigger signals.

Detection of the trigger signal by the digital controller 106 may be performed digitally. For example, the following pseudo code example describes logic that might be employed in some applications to synchronize a scan by the digital controller 106 of the touch sensors' 104 outputs with a rising edge of the trigger logic output signal:

while not (rising edge of trigger)
wait( );
scan_all_sensors( )

In some systems scanning may be initiated by an Interrupt Service Routine (ISR). The ISR may be triggered by a rising edge, falling edge, or both edges of the trigger logic output signal, depending on the implementation.

A scan of the sensors may be initiated relative to a same point (e.g., a same phase location) within the positive-going portion of the AC signal, or relative to a same point of the negative-going portion of the AC signal, or both. Scans may be initiated at a zero crossing of the AC signal.

Logic such as the pseudo code example above may be used in a polled control loop wherein the period for the scan_all_sensors( ) routine spans an odd number of consecutive rising edges of the trigger logic output signal. This ensures that if the first trigger event prior to entry of the scan_all_sensors( ) routine occurs during a positive portion of the coupled AC signal, that all following trigger events will also occur during a positive portion of the coupled AC signal.

Likewise, if the first trigger event prior to entry of the scan_all_sensors( ) routine occurs during a negative portion of the coupled AC signal, all following trigger events will also occur during a negative portion of the coupled AC signal. If the trigger signal generates an interrupt to the digital controller 106, instead of being polled, the interrupt service routine may maintain a flag, register, counter, or other semaphore to keep track of the odd/even count of the trigger event and act accordingly.

In an alternate embodiment, the trigger logic output signal may be generated using a half-wave responsive circuit, such as the opto-electric coupler 202 in FIG. 2, but with one of the two LEDs removed. Such a circuit is optically responsive to only one of the two half-cycles of the source AC signal; thus, only one trigger event is generated in each cycle of the AC signal, and only one starting point for measurement exists. With a half-wave triggered system, there are no requirements for counters or to ensure that the length of the measurement routine falls within specific period limits.

Thus, the logic of a DC powered touch sensor device may be adapted to trigger scanning of the touch sensors in response to a trigger signal generated at a same point or points in a cycle of the device's AC power signal. These adaptations may be applied in non-earth-grounded (or earth grounded) AC powered devices using isolated (or non-isolated) AC-DC power supplies and half (or full) wave demodulated touch sensor logic.

Figure 3:
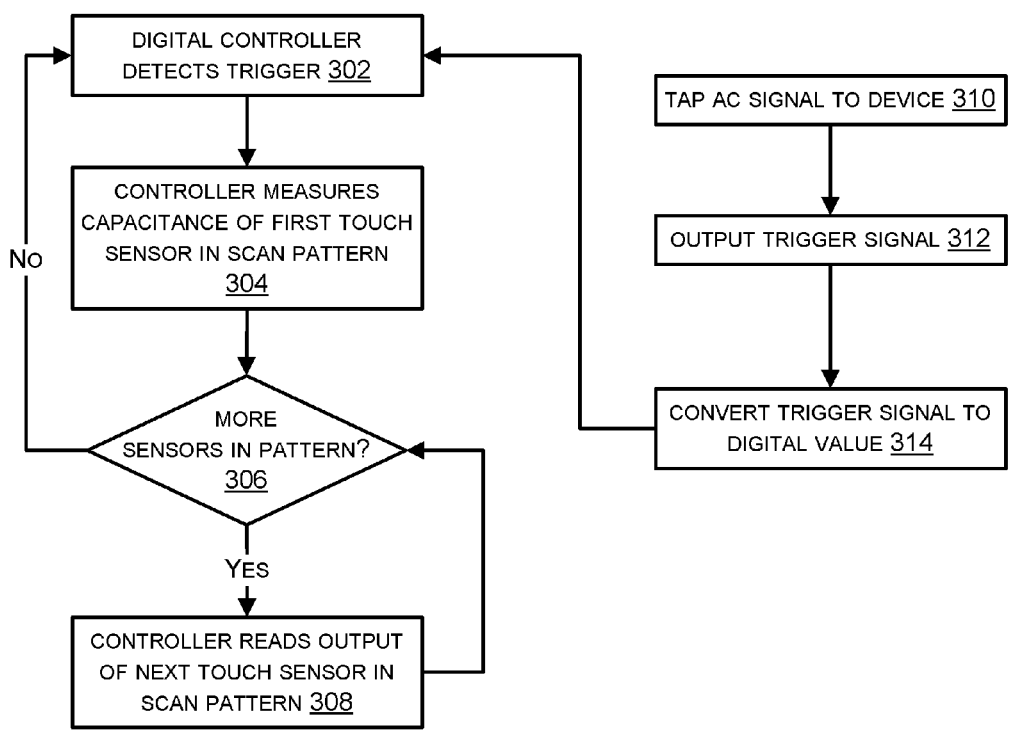
FIG. 3 illustrates an embodiment of a process for scanning touch sensors.

FIG. 3 illustrates an embodiment of a touch sensor scanning process in AC powered devices. The AC power signal that powers a device (having components that are DC powered) is tapped (310) to produce a trigger signal (312) having digital levels (314, one or more digital bits "1" or "0"). A digital controller detects the trigger signal (302) and may in particular wait for a specific digital transition of the trigger signal ("1" to "0" or "0" to "1", not illustrated). Upon detecting the trigger signal the digital controller scans the first touch sensor of multiple touch sensors of a scan pattern (304). While there are more sensors in the scan pattern (306), the controller scans the next sensor in the pattern (308). Depending upon the implementation, the scan pattern may include a single scan of all of the device's touch sensors during each cycle or partial cycle of the AC power signal, or scans of multiple groups of touch sensors, the scan of each group initiated in response to a different trigger signal. In such implementations, or any implementation involving a scan pattern that includes multiple sensors, it may be helpful to coordinate (synchronize) the scan of any particular sensor with the starting time of the scan pattern. In other words, the start time for the scan pattern is triggered at the same point each time in the AC cycle, and each subsequent sensor reading may be synchronized to this start time (either implicitly, via the time it takes to execute the logic to perform the reading, or explicitly, by checking and waiting a relative amount of time to read the next sensor).

Some implementations may input the output signal of the trigger logic to an analog to digital converter (ADC). In other words, instead of producing a trigger signal that is "1" or "0", one or more multi-bit digital values representing the level of the output of the trigger logic may be produced. The digital controller may wait for the level of the trigger logic output signal to have or exceed (or fall under) a particular multi-bit value before initiating the scan pattern. In other words, the 'digital value' that the trigger logic output signal is converted to may in some cases comprise multiple digital bits.

Thus to reduce the effects to AC noise introduced into the operation of multiple DC powered touch sensors, the AC power signal from which the DC power is produced may be monitored and a trigger signal generated that occurs at a predetermined point during each cycle of the AC power signal. Initiation of a scan pattern of the touch sensors may be delayed until the trigger signal occurs during each cycle of the AC power signal, and in some cases the time between reading different sensors in the pattern may also be controlled. A ramping trigger logic output signal may be converted to a digital one or zero (or a multi-bit digital value), and/or an edge type of the trigger logic output signal may be determined before starting the scan; or, the trigger logic output signal may be digitized using an ADC.

Figure 4:
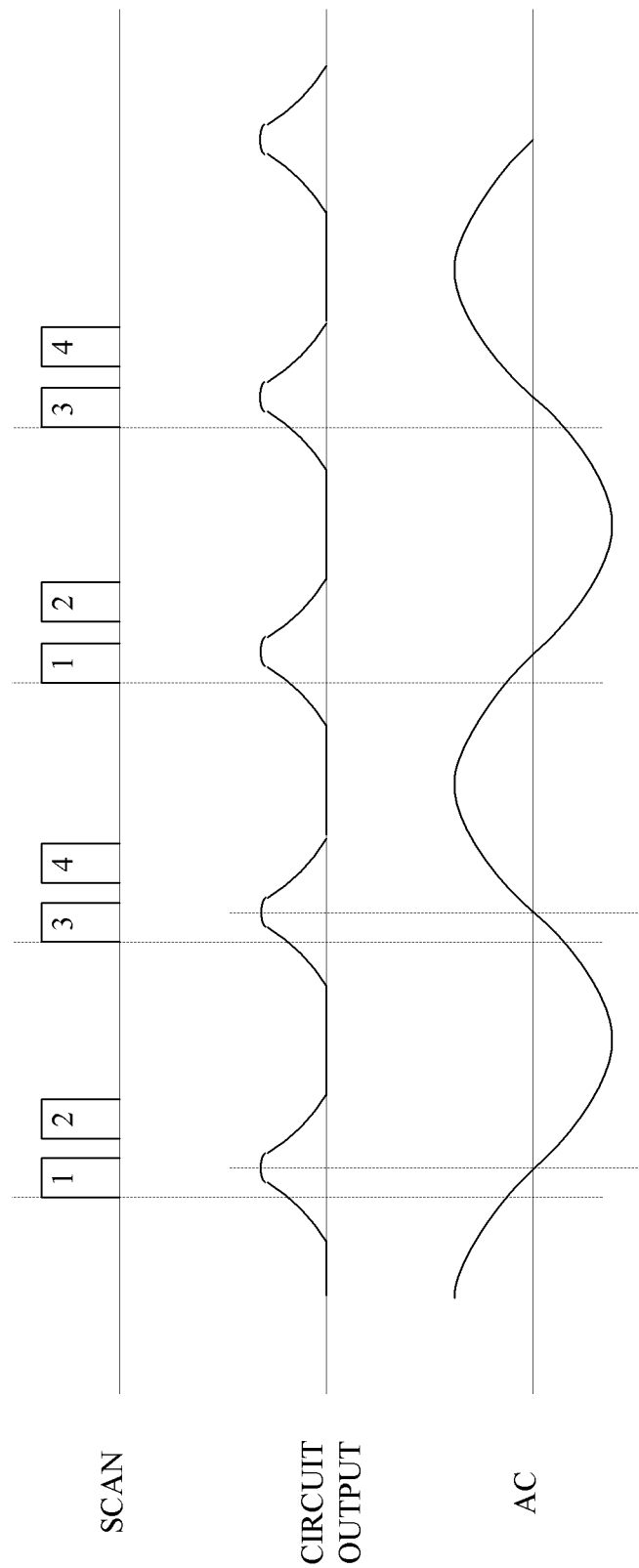
FIG. 4 illustrates signals in an exemplary system.

FIG. 4 illustrates timing in an exemplary touch sensor scanning system. For simplicity of illustration, not all of the effects of cutoff/saturation conditions in nonlinear devices (e.g., diodes and transistors) may be shown.

Two rising (and falling) edges of the output signal are produced in each full cycle of the AC signal; logic is available to produce a trigger event (which initiates a scan of a different group of sensors) on each output rising edge. The first rising edge of the output signal triggers a scan of sensor group (1,2). The second rising edge of the output signal triggers a scan of sensor group (3,4). Other embodiments may configure the trigger logic to produce only one rising edge per AC cycle (see the description above for some ways of doing this).

In FIG. 4, the total sensors are divided into two groups. A scan of one group (1,2) is initiated from the first trigger signal of the AC cycle, and a scan of the second group (3,4) is initiated (e.g., after the scan of the first group completes) from the second trigger signal of the AC cycle. The outputs of each sensor, in each group of sensors, are thus always measured relative to a same point in the AC cycle, because the two triggers always occur at the same points in the AC cycle.

Figure 5:
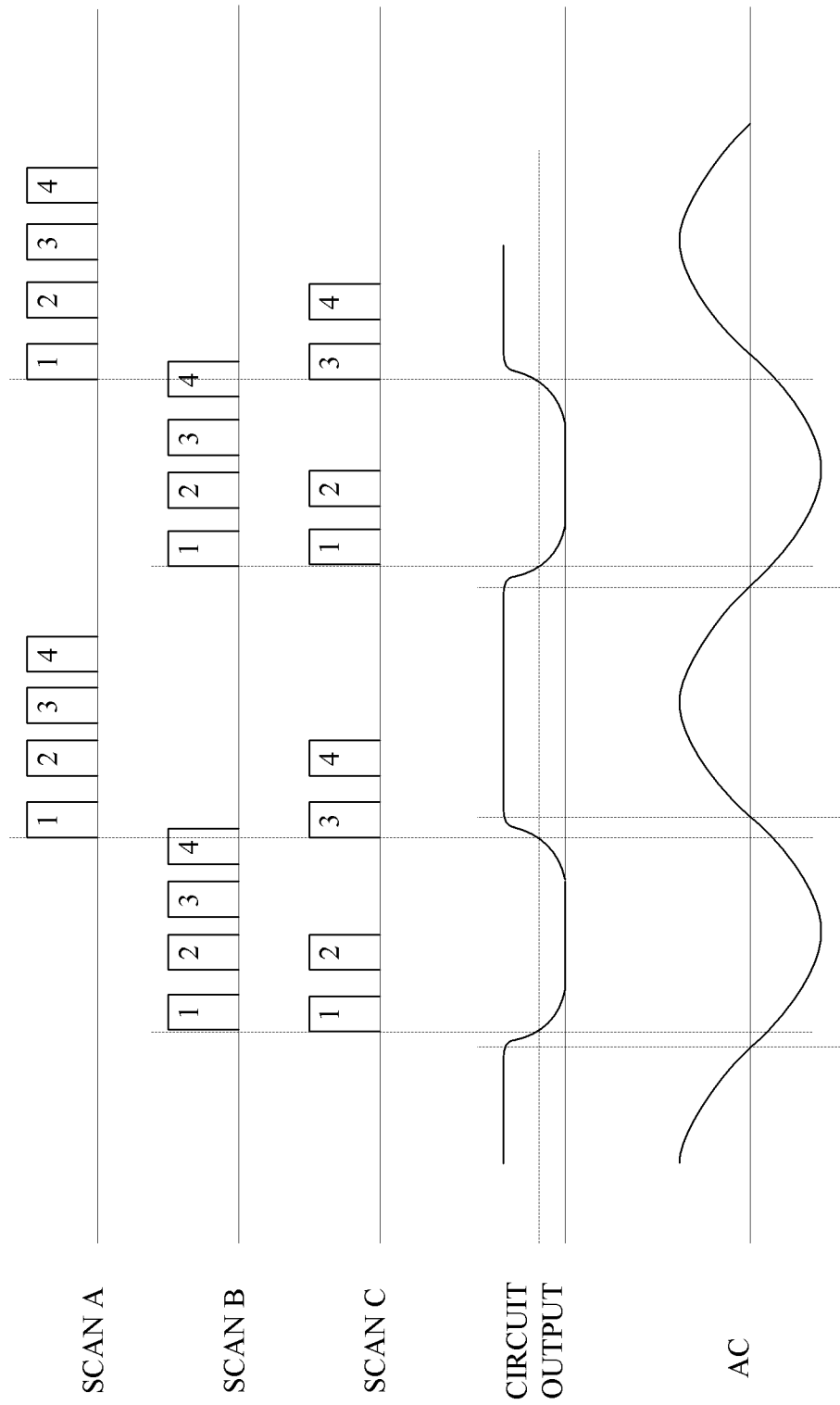
FIG. 5 illustrates various ways that a scan may be initiated from the trigger logic output signal.

FIG. 5 illustrates various ways that a scan may be initiated from the AC monitoring logic output signal. Note that the logic is modified from that in FIG. 2 to produce a half-wave response (as described previously). SCAN A illustrates a configuration in which a scan of all sensors is triggered by a rising edge of the logic output signal. SCAN B illustrates a configuration in which a scan of all sensors is initiated by a falling edge of the logic output signal. SCAN C illustrates a configuration in which a scan of different sensor groups is initiated on rising and falling edges of the logic output signal, respectively. A scan of group (1,2) is initiated by the falling edge of the logic output signal, and a scan of group (3,4) is initiated by the rising edge of the logic output signal. In one application (not illustrated) a scan of sensors or sensor groups is initiated by detecting when the AC power signal crosses zero.

In some applications the total sensors may be divided into groups, and the groups scanned with interleaving. For example, if two sensor groups are used, a scan of both groups may be initiated by the same trigger event. The system may scan one sensor from one group, then scan a sensor from another group, then scan a second sensor from the first group, then scan a second sensor from the second group, etc.

IMPLEMENTATIONS AND ALTERNATIVES

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g., read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A touch sensing system, comprising:
   a plurality of touch sensors operated using direct current (DC) power;
   a digital controller;
   logic to monitor an alternating current (AC) signal from which the DC power is derived and to produce a trigger signal to the digital controller; and
   logic to cause the digital controller to wait for the trigger signal before scanning outputs of the touch sensors.

2. The touch sensing system of claim 1, further comprising:
the logic to monitor the AC signal comprising an optoelectric isolation circuit.

3. The touch sensing system of claim 1, further comprising:
the digital controller using half-wave demodulation to scan the touch sensors.

4. The touch sensing system of claim 3, further comprising:
the touch sensors operating relative to a local ground reference and the AC signal being relative to an earth ground reference that is different from the local ground reference.

5. The touch sensing system of claim 1, further comprising:
logic to cause the controller to scan multiple groups of touch sensors during one period of the AC signal, a scan of each group triggered at a different point of the AC signal period.

6. The touch sensing system of claim 1, further comprising:
logic to convert the trigger signal to a digital value and to make the digital value available to the digital controller.

7. A device comprising:
an AC-DC power converter; and
a capacitive touch sensing system, comprising:
 a plurality of touch sensors operated using DC power from the power converter;
 a digital controller operated using DC power from the power converter;
 logic to monitor an AC signal from which the DC power is derived and to produce a trigger signal to the digital controller; and
 logic to cause the digital controller to respond to the trigger signal by initiating a scan of the touch sensors.

8. The touch sensing system of claim 7, further comprising:
the logic to monitor the AC signal comprising an optoelectric isolation circuit.

9. The touch sensing system of claim 7, further comprising:
the controller adapted to use half-wave demodulation to scan the touch sensors.

10. The touch sensing system of claim 9, further comprising:
the touch sensors operating relative to a local ground reference and the AC signal relative to an earth ground reference that is different from the local ground reference.

11. The touch sensing system of claim 7, further comprising:
logic to perform scans of multiple groups from among the touch sensors, a scan of each group triggered at a different point in a cycle of the AC signal.

12. The touch sensing system of claim 7, further comprising:
logic to convert the trigger signal to a digital value and to make the digital value available to the digital controller.

13. A method comprising:
powering a plurality of touch sensors using DC power derived from an AC power signal;
monitoring the AC power signal and producing from the AC power signal a trigger signal that occurs repeatedly at a same point in a cycle of the AC power signal; and
delaying a scan of the touch sensors until the trigger signal occurs during each cycle of the AC power signal.

14. The method of claim 13, further comprising:
converting a ramping output signal to a digital one or zero;
determining an edge type of the output signal; and
starting the scan of the touch sensors when the output signal has a particular edge type.

15. The method of claim 13, further comprising:
producing an optical signal with an intensity that tracks a level of the AC power signal; and
applying the optical signal to produce the trigger signal in the electrical domain.

16. The method of claim 13, further comprising:
producing the DC power from the AC power using an isolated power converter.

17. The method claim 13, further comprising:
scanning the touch sensors using a half wave demodulation sensing technique.

18. A method comprising:
introducing AC noise into at least one of a plurality of DC powered touch sensors; and
mitigating effects of the AC noise by:
 monitoring an AC power signal that produces the DC power;
 producing from the AC power signal a trigger signal that occurs repeatedly at a same point in a cycle of the AC power signal; and
 initiating a scan of the touch sensors by a digital controller when the trigger signal occurs during each cycle of the AC power signal.

19. The method claim 18, further comprising:
scanning the touch sensors using a half wave demodulation sensing technique.

20. The method of claim 18, further comprising:
converting a ramping value of an output signal to a digital one or zero;
determining an edge type of the output signal; and
initiating the scan of the touch sensors when the output signal has a particular edge type.

* * * * *